UNITED STATES PATENT OFFICE.

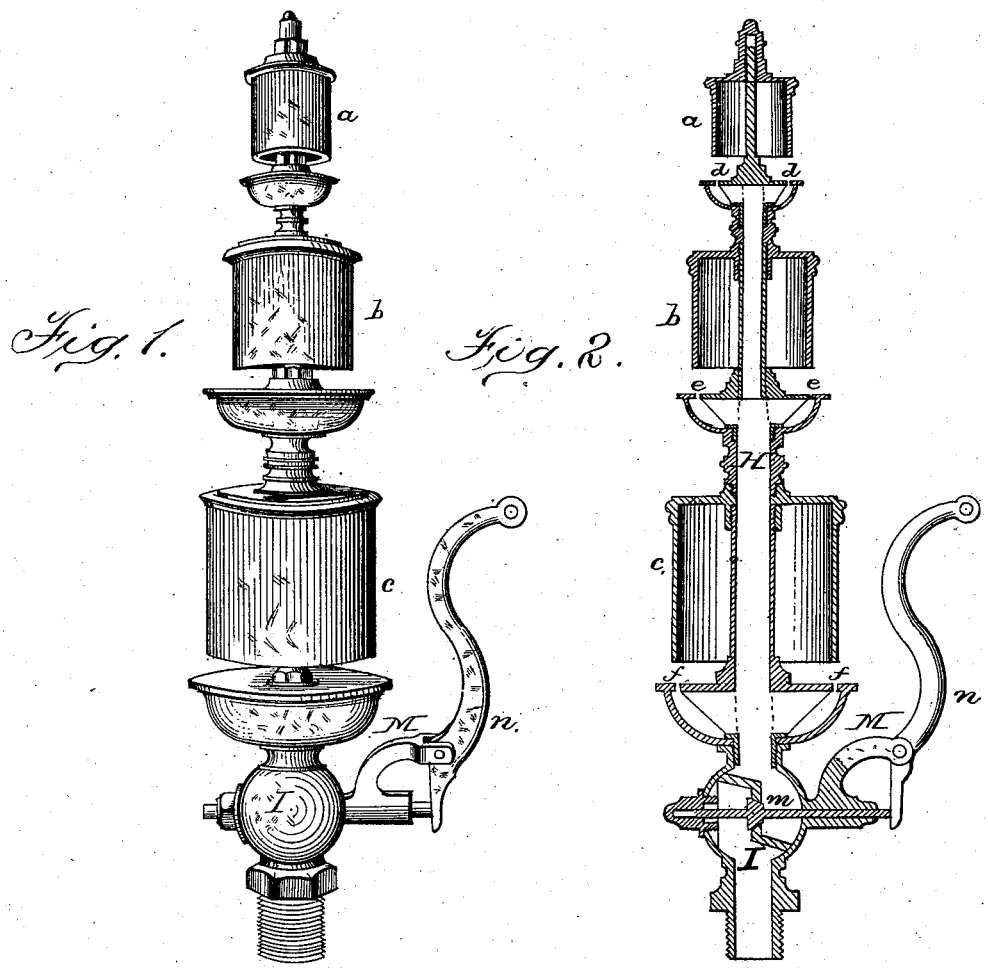

WILLIAM BARNETT, OF MANSFIELD, OHIO.

STEAM-WHISTLE.

SPECIFICATION forming part of Letters Patent No. 264,606, dated September 19, 1882.

Application filed July 1, 1882. (No model.)

*To all whom it may concern:*

Be it known that I, WILLIAM BARNETT, of Mansfield, in the county of Richland and State of Ohio, have invented a new and useful Improvement in Steam-Whistles, of which the following is a specification, reference being had to the accompanying drawings.

The invention relates to an improvement in steam-whistles; and it consists essentially in two or more whistles placed one above the other, and operated by one current of steam, the valves and bells diminishing in size, and the whole governed by one valve.

The nature of the invention and its mode of construction are clearly illustrated in the accompanying drawings, in which—

Figure 1 is a side elevation of an embodiment of the invention, and Fig. 2 is a central vertical section of same.

The embodiment of the invention shown in the drawings consists of three bells, a b c, supplied immediately below their chimes with the ports d e f, the bells and ports being of appropriate size, and arranged to produce the alarm by the passage of a single current of steam. The ports and bells are connected by suitable boxes, and contain the central pipe, H, through which the steam passes, with outlets at each of the ports d e f above mentioned. Below the lowest valve is provided the globular casing I, through which the current of steam passes, and which is provided with the valve m, which may be operated to open the passage through the globular casing by means of the lever n, pivoted in the bearings M.

The construction and operation of the whistle are simple, and will be readily understood by those skilled in the art to which the invention pertains.

In order to produce the alarm, it is simply necessary to open the valve m by pressing down on the lever n, when the current of steam will pass through the globular casing I and central pipe, H, finding an outlet at the ports d e f, as above set forth.

When it is desired to stop the alarm it is only necessary to release the lever n, when the steam pressing against the rear side of the valve m will cause the same to close and cut off the supply.

The invention is one of importance, and the embodiment illustrated is very effectual in its character, but is so simple that a further description is unnecessary.

I do not limit myself to the precise construction shown, since it is possible to make some modifications without departing from the essence of the invention; but

What I claim as new, and desire to secure by Letters Patent, is—

A steam-whistle consisting of two or more bells placed one above the other, and each supplied with a port, the bells and ports gradually diminishing in size, and all operated by a single current of steam controlled by the valve m, substantially as set forth.

In testimony that I claim the foregoing improvement in steam-whistles, as above described, I have hereunto set my hand this 13th day of May, 1882.

WILLIAM BARNETT.

Witnesses:
THOS. E. BARROWS,
H. E. BELL.